(12) United States Patent
Chen et al.

(10) Patent No.: US 10,959,087 B1
(45) Date of Patent: Mar. 23, 2021

(54) MAINTAINING ELECTRONIC SUBSCRIBER IDENTITY MODULE (ESIM) PROFILES ACROSS MULTIPLE MOBILE NETWORK OPERATORS (MNOS)

(71) Applicant: Sprint Communications Company L.P., Overland Park, KS (US)

(72) Inventors: Ran Chen, Overland Park, KS (US); Adrian M. Milner, Gardner, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/942,527

(22) Filed: Jul. 29, 2020

(51) Int. Cl.
| | |
|---|---|
| *H04W 8/24* | (2009.01) |
| *H04W 8/20* | (2009.01) |
| *H04W 8/18* | (2009.01) |
| *G06F 16/23* | (2019.01) |
| *H04W 88/06* | (2009.01) |

(52) U.S. Cl.
CPC ........ *H04W 8/183* (2013.01); *G06F 16/2379* (2019.01); *H04W 88/06* (2013.01)

(58) Field of Classification Search
None
See application file for complete search history.

(56) References Cited

U.S. PATENT DOCUMENTS

2020/0367053 A1* 11/2020 Yang ............... G06F 3/0643

* cited by examiner

*Primary Examiner* — Gary Lafontant

(57) ABSTRACT

A method of updating embedded universal integrated circuit cards (eUICCs) on wireless communication devices. The method comprises reviewing transactions associated with eUICCs on wireless communication devices by each of a plurality of mobile network operators (MNOs), based at least in part on reviewing the transactions by the MNOs, assigning each of the MNOs to one of a first tier, a second tier, and a third tier, receiving a eUICC transaction by an eUICC updating application executing on a computer from an MNO, determining by the eUICC updating application a tier the MNO is assigned to, and sending the eUICC transaction by the eUICC updating application to a wireless communication device subject to restrictions associated with the tier to which the MNO is assigned, whereby eUICC updating transactions of MNOs are restricted based on MNO tier assignments.

20 Claims, 10 Drawing Sheets

MAINTAINING ELECTRONIC SUBSCRIBER IDENTITY MODULE (ESIM) PROFILES ACROSS MULTIPLE MOBILE NETWORK OPERATORS (MNOS)

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may complete an authentication process with a cell site to obtain a wireless communication link from the cell site and access to the radio access network that the cell site is a part of. This may involve the mobile communication device radio modem obtaining network access keys or network access credentials from a subscriber identity module (SIM) and providing those network access keys or network access credentials to the cell site. The SIM may be a smart card that comprises memory and a processor. SIM cards may be removable in some circumstances, for example in traditional mobile phones. By removing a first SIM card and installing a second SIM card in a mobile phone, a user may change his or her service provider network. Removable SIM cards may not be provided in some mobile communication devices, where the role of the SIM card is instead performed by an embedded universal integrated circuit card (eUICC) that may be provisioned with network access keys and/or network access credentials, with branding information, with applications, and other data artifacts. The radio modem may then obtain the network access keys or network access credentials from the eUICC and provide those network access keys or network access credentials to the cell site to obtain a wireless communication link.

SUMMARY

In an embodiment, a method of updating embedded universal integrated circuit cards (eUICCs) on wireless communication devices is disclosed. The method comprises reviewing eUICC transactions associated with eUICCs on wireless communication devices by each of a plurality of mobile network operators (MNOs), based at least in part on reviewing the eUICC transactions by the MNOs, assigning each of the MNOs to one of a first tier, a second tier, and a third tier, receiving a first eUICC transaction by an eUICC updating application executing on a computer from a first MNO that is assigned to the first tier, determining by the eUICC updating application that the first MNO is assigned to the first tier, and sending the first eUICC transaction by the eUICC updating application to a wireless communication device without restriction. The method further comprises receiving a second eUICC transaction by the eUICC updating application from a second MNO that is assigned to the second tier, determining by the eUICC updating application that the second MNO is assigned to the second tier, and sending the second eUICC transaction by the eUICC updating application to a wireless communication device subject to restrictions associated with the second tier of MNOs. The method further comprises receiving a third eUICC transaction by the eUICC updating application from a third MNO that is assigned to the third tier, determining by the eUICC updating application that the third MNO is assigned to the third tier, and sending the third eUICC transaction by the eUICC updating application to a wireless communication device subject to restrictions associated with the third tier of MNOs, whereby eUICC updating transactions of MNOs are restricted based on MNO tier assignments.

In another embodiment, a method of managing updates to embedded universal integrated circuit cards (eUICCs) on wireless communication devices is disclosed. The method comprises receiving eUICC update reports from wireless communication devices by a hyperledger management application executing on a computer system, wherein each eUICC update report describes an eUICC update completed by one of the wireless communication devices and, for each eUICC update report received from the wireless communication devices, creating an eUICC update block by the hyperledger management application comprising a hash of a previous block of a first hyperledger stored in a data store, an identity of a wireless communication device, information about an eUICC update, and a hash over the hash of the previous block of the first hyperledger, over the identity of the wireless communication device, and over the information about the eUICC update. The method further comprises adding the created eUICC update blocks by the hyperledger management application to the first hyperledger, receiving eUICC transaction reports from mobile network operators (MNOs) by the hyperledger management application, wherein each eUICC transaction report describes an eUICC transaction completed by one of the MNOs, and, for each eUICC transaction report received from the MNOs, creating an eUICC transaction block by the hyperledger management application comprising a hash of a previous block of an associated MNO hyperledger stored in a data store, an identity of an MNO, information about the eUICC transaction, and a hash over the hash of the previous block of the associated MNO hyperledger, over the identity of the MNO, and over the information about the eUICC transaction. The method further comprises adding the created eUICC transaction block by the hyperledger management application to the associated MNO hyperledger, reading the blocks of the first hyperledger and of the MNO hyperledgers by an evaluation application executing on a computer system, analyzing the blocks by the evaluation application, based on analyzing the blocks, assigning a rating by the evaluation application to each of the MNOs, assigning each of the MNOs to a tier by the evaluation application based at least in part on the ratings of the MNOs, and restricting eUICC update activities of at least some of the MNOs based on the tier the MNO is assigned to.

In yet another embodiment, a method of reporting comparative results of mobile network operators. In an embodiment, the method comprises receiving eUICC transaction reports from mobile network operators (MNOs) by a hyperledger management application executing on a computer system, wherein each eUICC transaction report describes an eUICC transaction completed by one of the MNOs and, for each eUICC transaction report received from the MNOs, creating an eUICC transaction block by the hyperledger management application comprising a hash of a previous block of a hyperledger stored in a data store, an identity of an MNO, information about the eUICC transaction, and a hash over the hash of the previous block of the hyperledger, over the identity of the MNO, and over the information about the eUICC transaction. The method further comprises adding the created eUICC transaction block by the hyperledger management application to the hyperledger, reading the blocks of the hyperledger by an evaluation application executing on a computer system, analyzing the blocks by the evaluation application, based on analyzing the blocks, assigning a rating by the evaluation application to each of the MNOs, and providing an application programming interface (API) by the evaluation application, where potential subscribers to the MNOs are enabled to compare and evaluate the MNOs.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
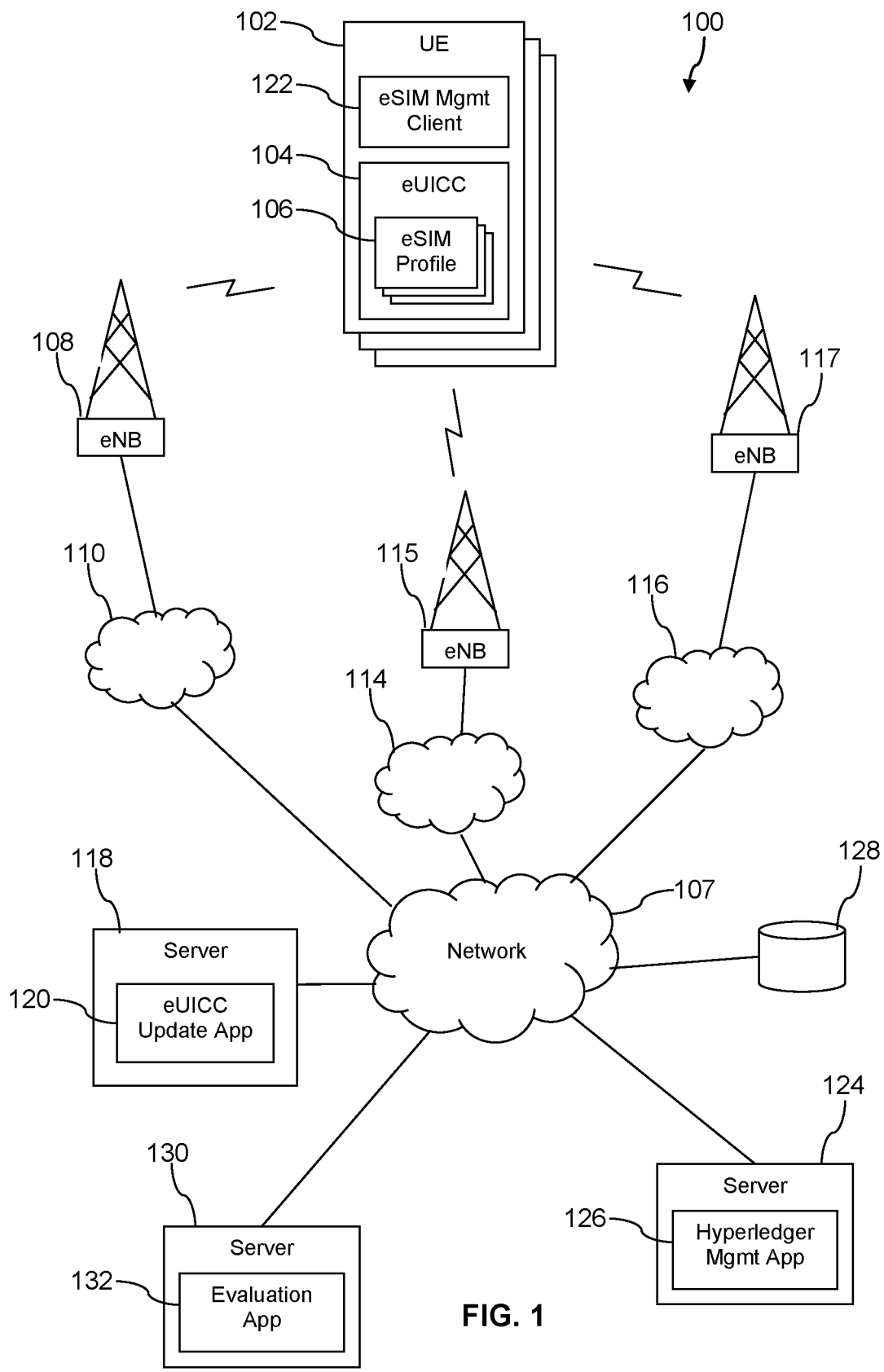
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The old paradigm of conducting subscriber authentication and service access authorization into a radio access network (e.g., to a cell tower) based on a fixed removable SIM card is being replaced by a new paradigm that relies on an electronic SIM (eSIM) profile stored in an embedded universal integrated circuit card (eUICC), where the eUICC is permanently wired to a motherboard of a wireless communication device (e.g., a layperson typically cannot remove the eUICC from the wireless communication device without damaging the eUICC and/or the wireless communication device). In some contexts, the eUICC may be referred to as an eSIM. The eSIM profile comprises data and optionally one or more sets of executable instructions (e.g., applications) that may be written into the eUICC. The eSIM profile comprises wireless communication service provider data and subscriber data. The wireless communication device (e.g., a radio modem) can lookup network access credentials that are part of the eSIM profile stored in the eUICC and present these network access credentials to the radio access network (RAN) to obtain a wireless communication link. To change wireless communication service, instead of removing a first SIM card and installing a second SIM card, the user activates a different eSIM profile on the wireless communication device (e.g., in the eUICC). This may involve erasing a first eSIM profile from the eUICC, downloading a second eSIM profile to the eUICC, and making the second eSIM profile now stored in the eUICC active. Some eUICCs have enough memory capacity to store multiple eSIM profiles concurrently. In this case, changing service is as simple as deactivating one eSIM profile stored in the eUICC and activating a second eSIM profile also stored in the eUICC.

The present disclosure teaches a system that allows different parties to initiate a plurality of levels of eSIM profile transactions based on trust levels of the parties, including in some instances the capability to modify eSIM profiles on wireless communication devices. Said in other words, the present disclosure provides a system for managing access of different parties to the eUICCs of wireless communication devices at modulated levels of access or trust to modify eSIM profiles stored in the eUICCs. Modifying eSIM profiles stored in the eUICCs may be generally referred to as updating the eUICCs. Updating eUICCs can include deleting an eSIM profile from the eUICC, adding or writing an eSIM profile into the eUICC, deactivating an eSIM profile in the eUICC, activating an eSIM profile in the eUICC, enabling an eSIM profile in the eUICC, disabling an eSIM profile in the eUICC, and changing the name of an eSIM profile. In some contexts, eSIM profile transactions may also be referred to as eUICC transactions. In some instances, a transaction that does not actually immediately affect an eUICC may still be referred to as an eSIM profile transaction or an eUICC transaction, for example when an eSIM profile is stored in a data store and a link to access that eSIM profile is sent in a message to a mobile communication device, whereby a user of the device may subsequently click on the link to download and install the eSIM profile in the eUICC of the device.

The system establishes a hyperledger blockchain to record (1) transactions of MNOs with reference to eSIM profiles stored in eUICCs on devices and (2) eSIM profile actions on devices. This hyperledger can be implemented as a distributed ledger hosted on servers maintained by fully trusted MNO partners. This hyperledger constitutes a consensus system that provides the desired level of security. The hyperledger can be audited, for example by the fully trusted MNOs, to evaluate conduct of quasi-trusted MNOs and untrusted MNOs, for example to verify that they are adhering to terms of conditions for being granted use of the system.

A part of the system involves different tiers of trust. For example, a three tier trust system may be implemented where an MNO is one of (1) trusted, (2) quasi-trusted, or (3) untrusted. In other embodiments, different numbers of trust tiers or trust levels may be implemented. An MNO can accumulate trust and graduate from lower levels of trust to higher levels of trusted by establishing a track record of responsible eSIM profile transactions and of not attempting higher level transactions which it is not authorized to perform. An MNO can accumulate trust or be boosted a trust level by virtue of a trusted MNO vouching for the subject MNO or by sponsoring the subject MNO.

Untrusted MNOs may be restricted to limited eSIM profile transactions. They may be able to load their eSIM profile onto a wireless communication device but not command the device to activate the eSIM profile. The untrusted MNO may be allowed to load their eSIM profile into an eSIM profile store (e.g., a data store) from which users may, at their discretion, manually download the eSIM to their wireless communication device and possibly activate the eSIM profile.

Quasi-trusted MNOs may be enabled to do more powerful eSIM profile transactions. They may be able to download their eSIM profile onto a wireless communication device and cause a GUI to pop up on the device, prompting the user to consider activating the downloaded eSIM profile to initiate wireless communication service with that MNO. But the quasi-trusted MNO may not be allowed to activate the downloaded eSIM profile. Alternatively, the quasi-trusted MNO may be allowed to activate the downloaded eSIM profile autonomously, but may not be allowed to delete another MNO's eSIM profile from the wireless communication device. The quasi-trusted MNO may be allowed to activate the downloaded eSIM profile and push a notification of the change to the wireless communication device. Fully trusted MNOs may be enabled to perform any eSIM profile related transactions—activate a profile, deactivate a profile, install a profile, delete a profile.

A hyperledger may be established for each individual wireless communication device. Another hyperledger may be established for each MNO, eSIM profile transactions and/or eUICC transactions performed by the MNO are tracked in its hyperledger. Trust level and trust promotion are determined by periodically analyzing the transaction history of an MNO by auditing the hyperledger associated with that MNO. In an embodiment, trusted MNOs are granted a voting right in trust promotion decisions regarding lower trust MNOs.

This system could generate a sort of "billboard" report on MNOs that may be used outside the system, for example by users to determine if they want to work with that MNO or to banks or others. The report may record the number of eUICC transactions refused because the MNO was not qualified to make that level of eUICC transaction and the number of eUICC transactions granted. The report may report a percentage of refused eUICC transactions, whereby a user may infer how responsible the MNO is.

The technological advance of using eUICCs in the place of removable SIM cards has advantages but also presents new challenges. In a business environment of increasing numbers of mobile virtual network operators (MVNO), a challenge arises as to how to conveniently, while still securely, enable new players to make changes to eSIM profiles. It is desirable to grant some eUICC update privileges to the new players, but this must be balanced against concerns of maintaining the integrity of the system and to protect the interests of subscribers (e.g., it is desirable to avoid the bad practice referred to as "slamming" in former times for peremptorily shifting one's long-distance voice service). The system and methods disclosed herein provide a technical solution for this technical problem delivered in the form of new information technology or new computer systems.

Turning now to FIG. 1, a system 100 is described. In an embodiment, the system 100 comprises a wireless communication device (user equipment (UE)) 102 having an embedded universal integrated circuit card (eUICC) 104 that stores an eSIM profile 106. The eSIM profile 106 comprises wireless communication service provider data and wireless communication service subscriber data. The eSIM profile 106 may comprise any of a phone number (e.g., an international mobile subscriber identity (IMSI)), a network identity (e.g., a public land mobile network (PLMN) identity), a country code, one or more network access keys, one or more network access credentials, one or more encryption keys, one or more preferred roaming lists (PRLs), one or more access point names (APNs), or one or more application service keys. The eSIM profile 106 may comprise one or more sets of executable instructions and/or applications. The eSIM profile 106 may comprise branding information and/or branding content. In some cases, the eUICC 104 may store a plurality of eSIM profiles 106 concurrently. In an embodiment, only one of the eSIM profiles 106 may be active at any one time.

The UE 102 (e.g., a radio modem of the UE 102) may read the active eSIM profile 106 stored in the eUICC 104 (e.g., by invoking an application programming interface (API) of a local profile assistant (LPA) executing in the eUICC 104 or otherwise executing on a processor of the UE 102) to obtain radio access network (RAN) authentication credentials and obtain a wireless communication link from a cell site 108 based on providing those RAN authentication credentials to the cell site 108. The cell site 108 may be associated with a first mobile network operator (MNO) RAN 110. The cell site 108 and the first MNO RAN 110 communicatively couples the UE 102 to a network 107. The network 107 comprises one or more public networks, one or more private networks, or a combination thereof. Depending on what eSIM profile 106 is active on the eUICC 104, the UE 102 may instead attach to a second cell site 115 associated with a second MNO RAN 114 or to a third cell site 117 associated with a third MNO RAN 116. While the MNO RANs 110, 114, 116 are shown separate from the network 107 in FIG. 1 to better illustrate the management of eSIM profiles 106, the MNO RANs 110, 114, 116 may equally be thought of as part of the network 107. The cell site 108, 115, 117 may provide a wireless communication link to the UE 102 according to a 5G, a long term evolution (LTE), a code division multiple access (CDMA), or a global system for mobile communications (GSM) telecommunication protocol. The UE 102 may be a cell phone, a mobile phone, a smart phone, a personal digital assistant (PDA), a wearable computer, a headset computer, a laptop computer, a notebook computer, a tablet computer, or an Internet of things (IoT) device. The system 100 may comprise any number of UEs 102, any number of cell sites 108, 115, 117, and any number of MNO RANs 110, 114, 116.

A user of the UE 102 may desire to switch his or her wireless communication service from a first wireless communication service provider to a second wireless communication service provider, for example to obtain anticipated better coverage, to obtain a better price for a wireless communication service subscription, or to obtain access to unique communication services. An eUICC update application 120 executing on a server 118 may be used by a wireless communication service provider to provide its eSIM profile 106 to the UE 102. It is understood that providing an eSIM profile 106 to the UE 102 may comprise a variety of different scenarios.

In a first scenario, the eSIM profile 106 may be stored in a data store 128, a link to the subject eSIM profile 106 may be provided to the UE 102 in a message (e.g., in a text message or in an email message), and the user of the UE 102 may select the link to retrieve the eSIM profile 106 from the data store 128 and install it in the eUICC 104. When the eSIM profile 106 retrieved from the data store 128 is installed in the eUICC 104, the user of the UE 102 may then activate that eSIM profile 106 in the eUICC 104, for example by invoking an eSIM profile management client 122 executing on the UE 102. The MNO may use the eUICC update application 120 to store its eSIM profile 106 in the data store 128 and to send the message containing the link to the eSIM profile 106 to the UE 102. Said in otherwords, the eUICC update application 120 may broker or mediate the MNO's eUICC transaction (e.g., storing the eSIM profile 106 in the data store 128 and sending the message with the link to the UE 102). The eUICC update application 120 may restrict access of different MNOs to the full range of eUICC transactions supported by the eUICC update application 120 based on a trust level or trust tier associated to the MNOs as described further hereinafter.

In a second scenario, the MNO may use the eUICC update application 120 to send its eSIM profile 106 to the UE 102 but not directly interact with the eUICC 104 or make the eSIM profile 106 active. In this case, the eUICC update application 120 may mediate the MNO's eUICC transaction by sending the eSIM profile 106 to the UE 102 and storing it in a memory of the UE 102 outside of the eUICC 104. The eSIM profile management client 122 executing on the UE 102 may then transfer the eSIM profile 106 to the eUICC 104 and possibly make it active. Alternatively, the eUICC update application 120 may mediate the MNO's eUICC transaction by sending the eSIM profile 104 to the UE 102 and causing the eSIM profile 106 to be stored in the eUICC 104 but not make the eSIM profile 106 active on the eUICC 104. In this second scenario, the user of the UE 102 may invoke the eSIM profile management client 122 to select activation of the eSIM profile 106 installed into the eUICC 104.

In a third scenario, the MNO may send its eSIM profile 106 to the UE 102, cause it to be installed in the eUICC 104, and cause that eSIM profile 106 to be activated in the eUICC 104. The MNO may use the eUICC update application 120 to send its eSIM profile 106 to the UE 102, cause the eSIM profile 106 to be installed in the eUICC 104, and cause the eSIM profile 106 to be activated in the eUICC 104.

In an embodiment, the eUICC update application 120 restricts MNOs assigned to a third tier of trust or a third level of trust to completing eUICC transactions according to the first scenario described above; restricts MNOs assigned to a second tier of trust or a second level of trust to completing eUICC transactions according to either the second scenario described above or the first scenario described above; and allows MNOs assigned to a first tier of trust or a first level of trust to completing eUICC transactions according to any of the third scenario described above, the second scenario described above, and the first scenario described above. Said in other words, MNOs assigned to the first tier of trust or the first level of trust are granted access to any of the eUICC transactions supported by the eUICC update application 120. In some contexts, the MNOs assigned to the first tier of trust or the first level of trust may be said to be provided unrestricted access to eUICC transactions.

The eUICC update application 120 may provide access to eUICC transactions via an application programming interface (API) extended for use by the MNOs. The eUICC update application 120 may store in a memory of the server 118 a list of MNOs and associate each MNO to a specific trust level or trust tier. Alternatively, a list of MNOs and their associated trust level or trust tier is stored in the data store 128 or in another data store. When an MNO invokes the API of the eUICC update application 120 to complete an eUICC transaction, the eUICC update application 120 identifies the trust level or trust tier assigned to that MNO and determines if the MNO is qualified by its trust level or trust tier to invoke the subject eUICC transaction. If the MNO is so qualified, the eUICC update application 120 attempts to perform the requested eUICC transaction. If the MNO is not so qualified, the eUICC update application 120 rejects the requested eUICC transaction.

The system 100 further comprises a hyperledger management application 126 that executes on a server 124. The hyperledger management application 126 generates and maintains a separate hyperledger for each of the MNOs and a hyperledger for UEs. Each MNO hyperledger records eUICC transaction events initiated by the subject MNO. Each MNO hyperledger comprises a plurality of blocks arranged in a blockchain where each block comprises a hash of a previous block in the MNO hyperledger, an identity of the MNO, information about an eUICC transaction event, and a hash of that block itself over the hash of the previous block, the identity of the MNO, and the information about the eUICC transaction event. The information about the eUICC transaction event may identify a UE that was the target of the eUICC transaction and a type of eUICC transaction. The blocks of the MNO hyperledgers may be referred to as eUICC transaction blocks in some contexts.

The UEs hyperledger records UE actions related to eSIM profile events. The UEs hyperledger records reflect some but not all of the eUICC transaction events stored in the collection of MNO hyperledgers. For example eUICC transaction events stored in an MNO hyperledger associated with an API call by the MNO that was rejected by the eUICC update application 120 would not be reflected in the UEs hyperledger. The UEs hyperledger comprises a plurality of blocks arranged in a blockchain where each block comprises a hash of a previous block of the UEs hyperledger, an identity of a UE, information about an eUICC transaction event experienced by the UE, and a hash of that block itself over the hash of the previous block, the identity of the UE, and the information about the eUICC transaction event experienced by that UE. The information about the eUICC transaction event may identify an MNO that initiated the eUICC transaction and a type of eUICC transaction.

The eUICC update application 120 may send messages to the hyperledger management application 126 describing eUICC transaction events, and the hyperledger management application 126 may generate blocks and attach them to MNO hyperledgers accordingly. The UEs 102 may send messages to the hyperledger management application 126 describing UE actions related to eSIM profile events, and the hyperledger management application 126 may generate blocks and attach them to the UEs hyperledger accordingly. Alternatively, the UEs 102 may send messages to the eUICC update application 120 describing UE actions related to eSIM profile events, the eUICC update application 120 may send the information about the eSIM profile events to the hyperledger management application 126, and the hyperledger management application 126 may generate blocks and attach them to the UEs hyperledger accordingly. In an embodiment, the eSIM management client 122 sends the messages describing UE actions related to eSIM profile events. The eSIM profile events may be events of receiving a message having a link to an eSIM profile 106 stored in the data store 128, events of storing an eSIM profile 106 in a memory of the UE 102, events of storing an eSIM profile 106 in the eUICC 104, events of deactivating an eSIM profile in the eUICC 104, events of activating an eSIM profile 106 in the eUICC 104, and events of deleting an eSIM profile 106 from the eUICC 104.

In an embodiment, the hyperledgers are managed by a plurality of MNOs, for example MNOs who are assigned to the first tier of trust or the first level of trust and hence may be considered proprietors of the eUICC update framework. The hyperledgers thus may be implemented by a distributed data storage system that maintains accuracy through a consensus arrangement. Each of the MNOs involved in maintaining the distributed data store maintains its own copy of each of the hyperledgers and may be called upon to validate blocks of any hyperledger by other involved MNOs whereby to achieve consensus.

In an embodiment, the system 100 comprises a server 130 that executes an evaluation application 132. The evaluation application 132 may evaluate each of the MNOs that use the eUICC update application 120 (e.g., MNOs that are registered to use the eUICC update application 120) and assign a rating to each MNO. The rating may be a numeric value assigned from a constrained range, for example an integer, a rational number, or an irrational number from 0 to 10, from 0 to 100, from 1 to 10, from 1 to 100, or some other constrained range of numbers. The rating may be associated with a level of trust attached to the MNO based on its history of eUICC transactions invoked through the API of the eUICC update application 120 and based on other information. The evaluation application 132 may itself read the UEs hyperledger and the MNO hyperledgers. Alternatively, the evaluation application 132 may be fed a digest of the contents of the UEs hyperledger and digests of the content of the MNO hyperledgers by the hyperledger management application 126. The evaluation application 132 may generate the rating of an MNO based on its track record of confining its invocations of the API of the eUICC update application 120 to eUICC transactions to which it is granted access by its trust tier or trust level.

The MNOs assigned to the first trust tier or first trust level (e.g., MNOs that may be said to be proprietors of the eUICC update framework comprised of the server 118, the server 124, and the server 130) may vote on whether to promote an MNO from the third trust tier or trust level to the second trust tier or trust level and to promote an MNO from the second trust tier or trust level to the first trust tier or trust level based on its rating. The MNOs may further take into account other factors in voting to promote another MNO, for example taking into account a collaborative relationship it may have established with the other MNO. In an embodiment, an MNO may promote another MNO based on vouching for the other MNO to its peer MNOs. This vouching may comprise accepting liability for misuse the other MNO may cause.

In an embodiment, the evaluation application 132 may publish or otherwise make available information about the MNOs, for example through a web site or web application that has access to the scores of the MNOs. Users may access the web site to see the scores of MNOs to assist them in determining what MNOs to buy wireless communication service from. Banks may use the scores to assess the MNOs. Other information in addition to the scores generated by the evaluation server may be provided by the web site. The servers 118, 124, 130 may be implemented as computer systems. Computer systems are described further hereinafter.

Figure 2A:
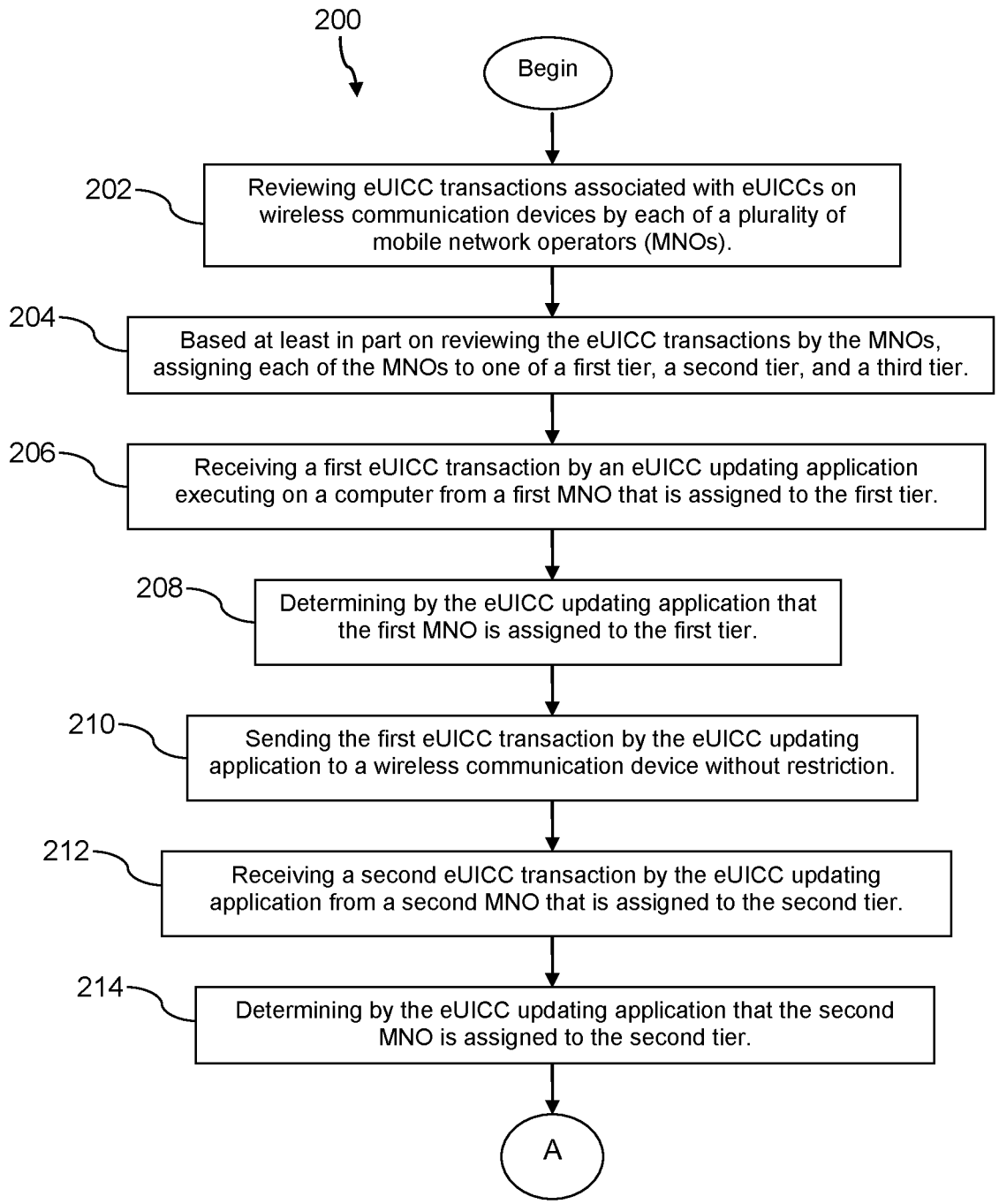
FIG. 2A and FIG. 2B is a flow chart of a method according to an embodiment of the disclosure.
Figure 2B:
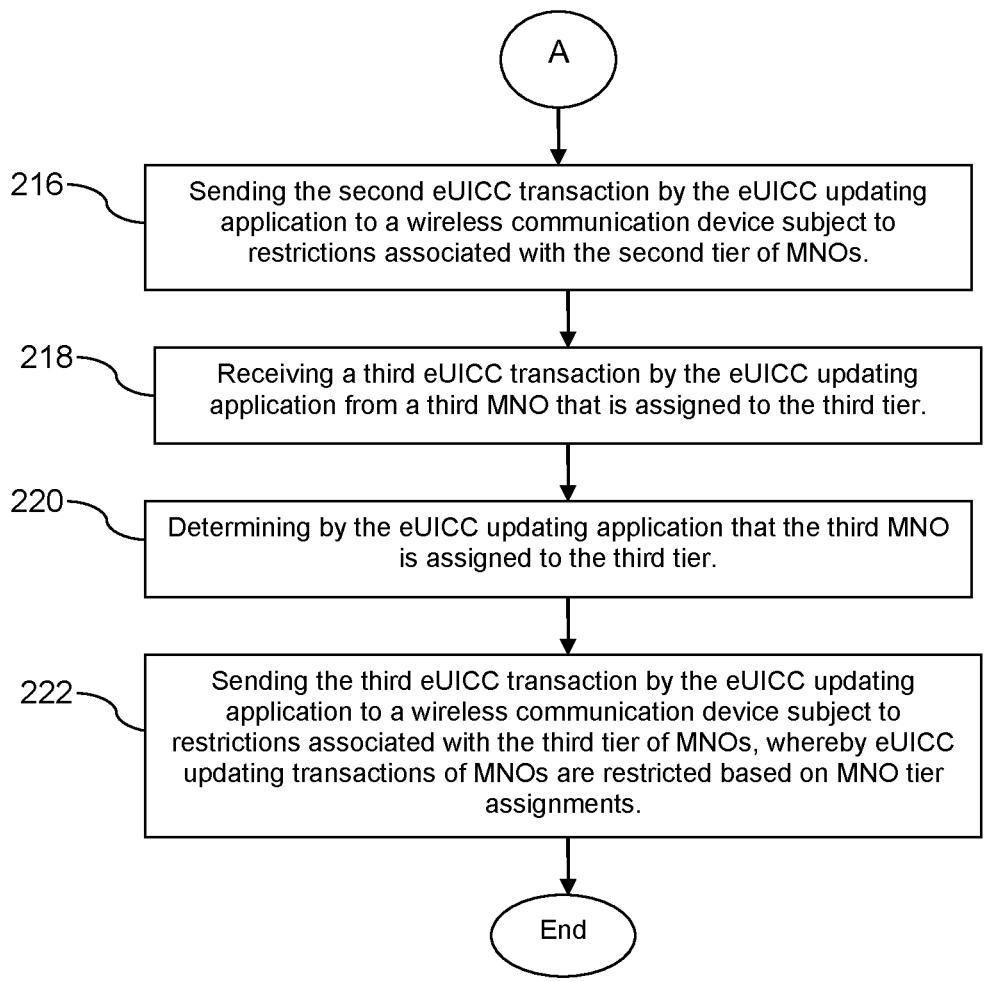

Turning now to FIG. 2A and FIG. 2B, a method 200 is described. In an embodiment, the method 200 is a method of updating embedded universal integrated circuit cards (eUICCs) on wireless communication devices. At block 202, the method 200 comprises reviewing eUICC transactions associated with eUICCs on wireless communication devices by each of a plurality of mobile network operators (MNOs). At block 204, the method 200 comprises, based at least in part on reviewing the eUICC transactions by the MNOs, assigning each of the MNOs to one of a first tier, a second tier, and a third tier. In an embodiment, the processing of block 202 and block 204 may be performed by the evaluation application 132 executing on the server 130 described above with reference to FIG. 1. The assignment of MNOs to different tiers (e.g., different tiers or trust or levels of trust) may be based on a score determined by the evaluation application 132 based on reviewing eUICC transactions initiated by the MNOs. The assignment of MNOs to different tiers may be based on a score range associated with each different tier. Alternatively, a predefined percentage of MNOs that are not proprietors of the eUICC update framework (e.g., the servers 118, 124, 130 described above with reference to FIG. 1) may be assigned to the second tier based on their scores and the remainder of the MNOs that are not proprietors of the eUICC update framework may be assigned to the third tier.

At block 206, the method 200 comprises receiving a first eUICC transaction by an eUICC updating application executing on a computer from a first MNO that is assigned to the first tier. At block 208, the method 200 comprises determining by the eUICC updating application that the first MNO is assigned to the first tier. At block 210, the method 200 comprises sending the first eUICC transaction by the eUICC updating application to a wireless communication device without restriction. The first eUICC transaction may be any eUICC transaction. eUICC transactions may comprise deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile. An eUICC transaction may comprise sending a message to a UE that comprises a link to an eSIM profile stored on a data store and inviting the user to click on the link to download and install the subject eSIM profile. This eUICC transaction may further comprise storing the eSIM profile in the data store.

At block 212, the method 200 comprises receiving a second eUICC transaction by the eUICC updating application from a second MNO that is assigned to the second tier. At block 214, the method 200 comprises determining by the eUICC updating application that the second MNO is assigned to the second tier. At block 216, the method 200 comprises sending the second eUICC transaction by the eUICC updating application to a wireless communication device subject to restrictions associated with the second tier of MNOs. Sending second eUICC transaction subject to restrictions may comprise allowing some types of eUICC transactions but rejecting other eUICC transactions. For example, the second MNO may be restricted from (e.g., prevented from) deleting an eSIM profile from an eUICC. For example the second MNO may be restricted from activating an eSIM profile on an eUICC. For example, the second MNO may be restricted from deactivating an eSIM profile on an eUICC. The second MNO may be allowed to install an eSIM profile into an eUICC. The second MNO may be allowed to pop-up a graphical user interface (GUI) on a display of the UE, present a message indicating the subject eSIM profile has been copied onto the UE (e.g., into the eUICC), and invite the user to click a button to activate the subject eSIM profile.

At block 218, the method 200 comprises receiving a third eUICC transaction by the eUICC updating application from a third MNO that is assigned to the third tier. At block 220, the method 200 comprises determining by the eUICC updating application that the third MNO is assigned to the third tier. At block 222, the method 200 comprises sending the third eUICC transaction by the eUICC updating application to a wireless communication device subject to restrictions associated with the third tier of MNOs, whereby eUICC updating transactions of MNOs are restricted based on MNO tier assignments. In an embodiment, the third eUICC transaction may be restricted to sending a message to the UE that comprises a link to an eSIM profile stored on a data store and inviting the user to click on the link to download and install the subject eSIM profile. In an embodiment, restricting the third eUICC transaction comprises disallowing any of deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile.

Figure 3A:
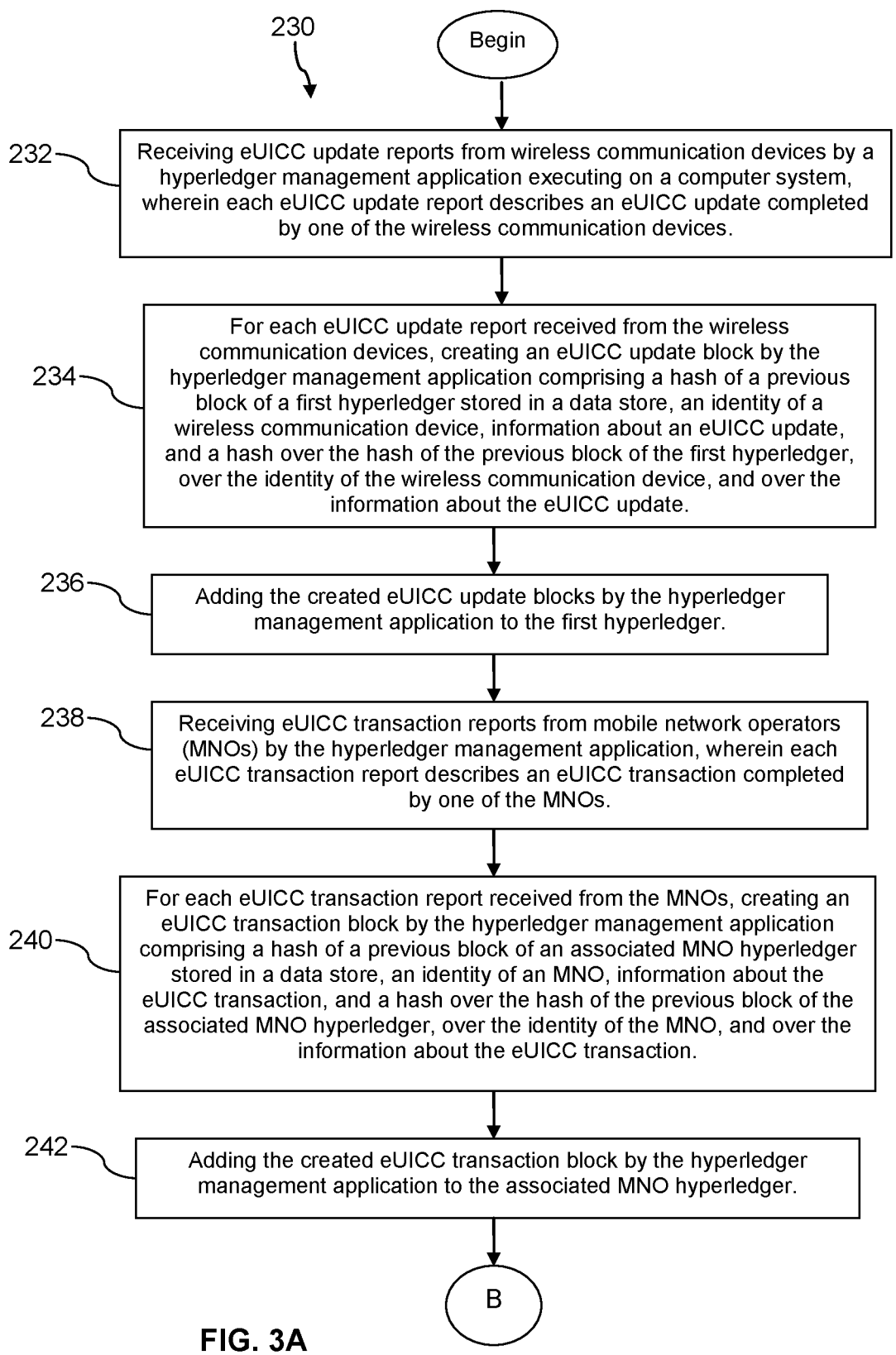
FIG. 3A and FIG. 3B is a flow chart of another method according to an embodiment of the disclosure.
Figure 3B:
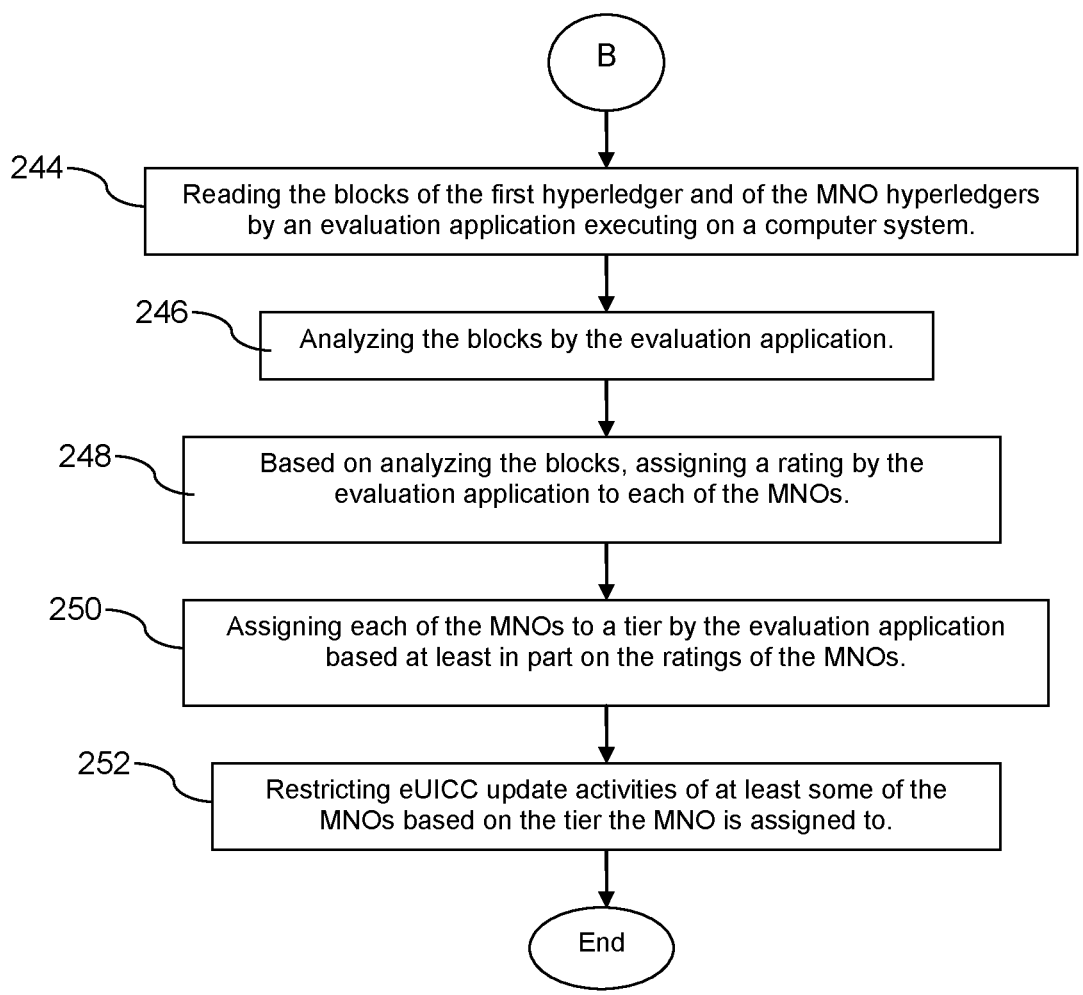

Turning now to FIG. 3A and FIG. 3B, a method 230 is described. In an embodiment, the method 230 is a method of managing updates to embedded universal integrated circuit cards (eUICCs) on wireless communication devices. At block 232, the method 230 comprises receiving eUICC update reports from wireless communication devices by a hyperledger management application executing on a computer system, wherein each eUICC update report describes an eUICC update completed by one of the wireless communication devices. In an embodiment, the eUICC update reports may be sent by the wireless communication devices (e.g., UEs 102) to an eUICC update application, and the eUICC update application may send the eUICC update reports to the hyperledger management application. Alternatively, in an embodiment, the eUICC update reports may be send by the wireless communication devices to the hyperledger management application directly. In an embodiment, the eUICC updates comprise deleting an eSIM profile from an eUICC, adding an eSIM profile to an eUICC, deactivating an eSIM profile of an eUICC, activating as eSIM profile of an eUICC, enabling an eSIM profile, of an eUICC, disabling an eSIM profile of an eUICC, and editing a name of an eSIM profile.

At block 234, the method 230 comprises, for each eUICC update report received from the wireless communication devices, creating an eUICC update block by the hyperledger management application comprising a hash of a previous block of a first hyperledger stored in a data store, an identity of a wireless communication device, information about an eUICC update, and a hash over the hash of the previous block of the first hyperledger, over the identity of the wireless communication device, and over the information about the eUICC update. The information about the eUICC update may comprise an identify of an MNO that initiated the eUICC update and a type of eUICC update. At block 236, the method 230 comprises adding the created eUICC update blocks by the hyperledger management application to the first hyperledger. In an embodiment, the first hyperledger is implemented as a distributed datastore, and the processing of block 236 comprises adding the created eUICC update blocks to each of the distributed instances of the first hyperledger.

At block 238, the method 230 comprises receiving eUICC transaction reports from mobile network operators (MNOs) by the hyperledger management application, wherein each eUICC transaction report describes an eUICC transaction completed by one of the MNOs. In an embodiment, the eUICC transactions comprise deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile. In an embodiment, the eUICC transactions comprise sending a message to a wireless communication device that comprises a link to an eSIM profile stored in a data store and that invites the user of the wireless communication device to click on the link to download and install the eSIM profile stored in the data store.

At block 240 the method 230 comprises, for each eUICC transaction report received from the MNOs, creating an eUICC transaction block by the hyperledger management application comprising a hash of a previous block of an associated MNO hyperledger stored in a data store, an identity of an MNO, information about the eUICC transaction, and a hash over the hash of the previous block of the associated MNO hyperledger, over the identity of the MNO, and over the information about the eUICC transaction. In an embodiment, the hyperledger management application maintains a separate MNO hyperledger for each different MNO. For example, the hyperledger management application maintains a first MNO hyperledger for a first MNO associated with the first MNO RAN 110, a second MNO hyperledger for a second MNO associated with the second MNO RAN 114, and a third MNO hyperledger for a third MNO associated with the third MNO RAN 116. In an embodiment, the information about the eUICC transaction comprises an identity of a wireless communication device associated with the eUICC transaction and a type of the eUICC transaction. In an embodiment, the information about the eUICC transaction comprises an indication of granting the eUICC transaction or rejecting the eUICC transaction.

At block 242, the method 230 comprises adding the created eUICC transaction block by the hyperledger management application to the associated MNO hyperledger. In an embodiment, the MNO hyperledgers are implemented as a distributed datastore, and the processing of block 242 comprises adding the created eUICC transaction blocks to each of the distributed instances of the MNO hyperledger.

At block 244, the method 230 comprises reading the blocks of the first hyperledger and of the MNO hyperledgers by an evaluation application executing on a computer system. At block 246, the method 230 comprises analyzing the blocks by the evaluation application. At block 248, the method 230 comprises, based on analyzing the blocks, assigning a rating by the evaluation application to each of the MNOs. In an embodiment, the rating is determined as a number that is a sum of weighted factors (e.g., each factor is multiplied by a coefficient or "weight" associated with that specific factor). In an embodiment, the factors comprise a number of rejected eUICC transactions requested by an MNO, a number of eUICC transaction requests by an MNO, a percentage of eUICC transaction requests versus an allowance for eUICC transactions for the MNO per period of time, and a tenure of an MNO in an assigned tier.

At block 250, the method 230 comprises assigning each of the MNOs to a tier by the evaluation application based at least in part on the ratings of the MNOs. At block 252, the method 230 comprises restricting eUICC update activities of at least some of the MNOs based on the tier the MNO is assigned to.

Figure 4:
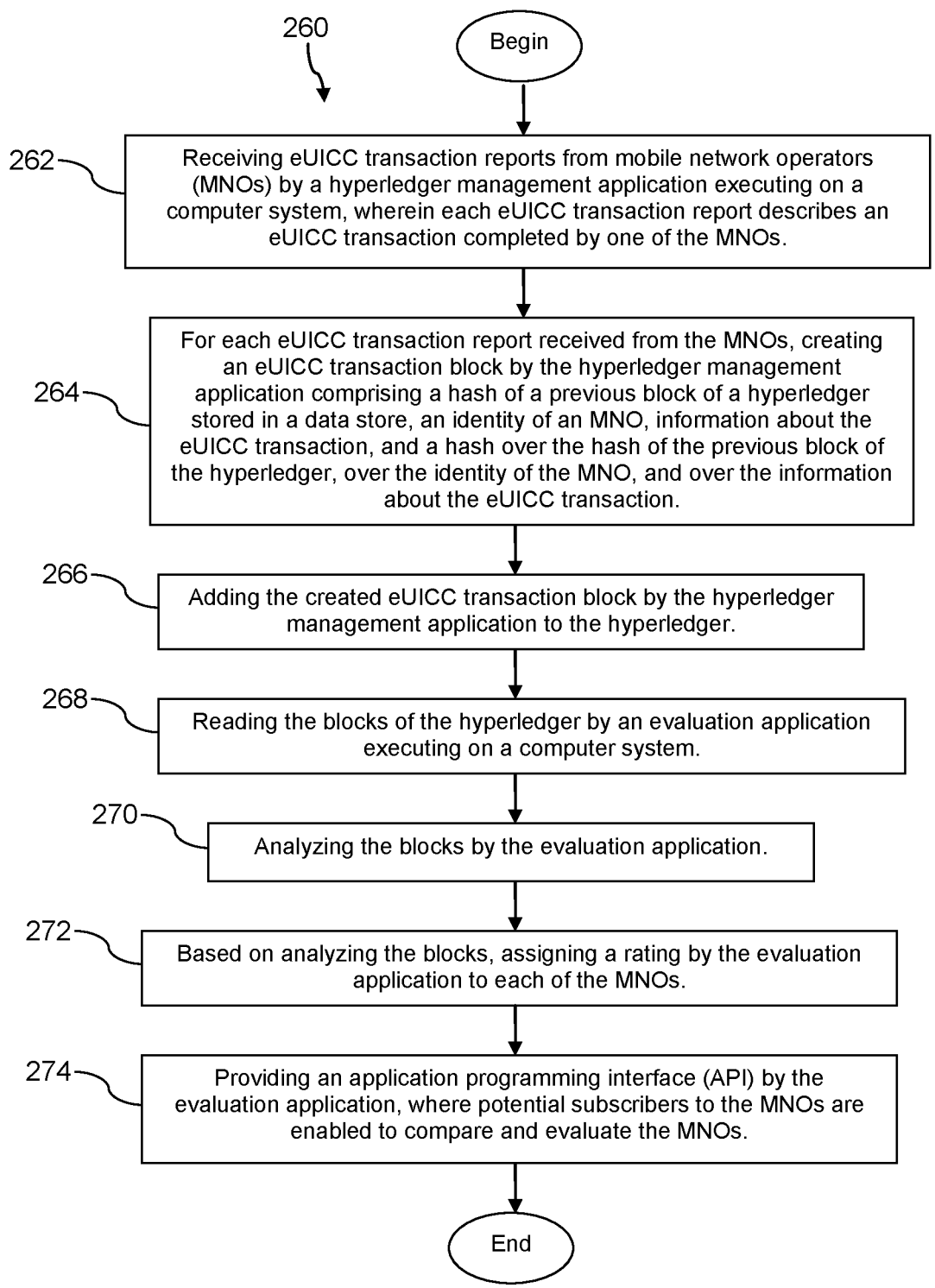
FIG. 4 is a flow chart of yet another method according to an embodiment of the disclosure.

Turning now to FIG. 4, a method 260 is described. In an embodiment, the method 260 is a method of reporting comparative results of mobile network operators. At block 262, the method 260 comprises receiving eUICC transaction reports from mobile network operators (MNOs) by a hyperledger management application executing on a computer system, wherein each eUICC transaction report describes an eUICC transaction completed by one of the MNOs. The eUICC transaction reports may be provided to the hyperledger management application by the eUICC update application 120 described above with reference to FIG. 1. Alternatively the eUICC transaction reports may be provided to the hyperledger management application by the MNOs each time the MNOs invoke the API of the eUICC update application 120 to request some eUICC or eSIM profile related operation to be completed on their behalf by the eUICC update application 120.

The eUICC transaction reports may identify an attempted eUICC transaction such as adding an eSIM profile to an eUICC, deleting an eSIM profile from an eUICC, deactivating an eSIM profile of an eUICC, activating an eSIM profile of an eUICC, enabling an eSIM profile, of an eUICC, disabling an eSIM profile of an eUICC, or editing a name of an eSIM profile. In an embodiment, the eUICC transaction report may identify an event of an MNO storing an eSIM profile 106 in the data store 128 and sending a message to the UE 102 comprising a link to the eSIM profile 106, whereby the user of the UE 102 may take action on receiving the message by clicking on the link to download the eSIM profile 106 and possibly activating the downloaded eSIM profile 106. The eUICC transaction reports may also identity a wireless communication device (e.g., UE 102) and/or an eUICC 104 that is the target for the eUICC transaction. The eUICC transaction report may also identify a current trust tier assignment or a current trust level assignment of the MNO that initiated the eUICC transaction. The eUICC transaction report may comprise a timestamp.

At block 264, the method 260 comprises, for each eUICC transaction report received from the MNOs, creating an eUICC transaction block by the hyperledger management application comprising a hash of a previous block of a hyperledger stored in a data store, an identity of an MNO, information about the eUICC transaction, and a hash over the hash of the previous block of the hyperledger, over the identity of the MNO, and over the information about the eUICC transaction. At block 266, the method 260 comprises adding the created eUICC transaction block by the hyperledger management application to the hyperledger. In an embodiment, each different MNO is associated with a different hyperledger. Said in other words, the hyperledger management application may add blocks associated with a first MNO to a first MNO hyperledger and may add blocks associated with a second MNO to a second MNO hyperledger.

At block 268, the method 260 comprises reading the blocks of the hyperledger by an evaluation application executing on a computer system. At block 270, the method 260 comprises analyzing the blocks by the evaluation application. Analyzing the blocks by the evaluation application may comprise determining a count and/or a percentage of rejected eUICC transaction attempts. Analyzing the blocks by the evaluation application may comprise determining if the MNO has repeatedly attempted to update the same UE 102 and/or the same eUICC 104 and been rejected repeatedly, whereby a pattern of abuse might be discerned by the evaluation application.

Analyzing the blocks by the evaluation application may comprise comparing a number of eUICC transactions initiated by an MNO during a period of time to a predefined allowance of eUICC transactions associated with the MNO. For example, in an embodiment, the proprietors of the eUICC update framework (e.g., the servers 118, 124, 130) may grant a predefined number of eUICC transactions to an MNO during a period of time, for example during an hour, during a day, during a week, or during a month. The proprietors of the eUICC update framework may promulgate the allowance of eUICC transactions via the eUICC update application 120 to the MNOs. In an embodiment, a first allowance of eUICC transactions per period of time may be defined for MNOs associated with a third trust tier or a third trust level and a second allowance of eUICC transactions per period of time may be defined for MNOs associated with a second trust tier or a second trust level. In an embodiment, different MNOs assigned to the same trust tier or trust level may be assigned different allowances of eUICC transactions per period of time based on their tenure in their assigned trust tier or trust level and based on their past good behavior. Restraining MNOs to a predefined allowance of eUICC transactions per period of time may help in evaluating the integrity and cooperativeness of the MNOs before giving them too much access and too much privilege in the eUICC update framework.

At block 272, the method 260 comprises, based on analyzing the blocks, assigning a rating by the evaluation application to each of the MNOs. The rating may be a number in a constrained range. The rating may be an integer, a rational number, or an irrational number in a constrained range, for example 0 to 10, 1 to 10, 0 to 100, 1 to 100, 0.0 to 10.0, 1.0 to 10.0, 0.0 to 100.0, or 1.0 to 100.0. The rating may be a number in a constrained range different from the examples given above. The rating need not be a positive or a non-negative number. In an embodiment, the rating may be determined as a sum of weighted factors (e.g., the factors are each multiplied by a coefficient or 'weight' that is predefined for that specific factor), where each different evaluation factor is multiplied by a proportional factor based on the perceived importance of the subject factor and the products summed to reach the rating. Different factors can be number of rejected eUICC transactions requested by the MNO, percentage of rejected eUICC transaction requests of all eUICC transactions requests by the MNO, number of eUICC transaction requests, percentage of eUICC transaction requests versus the allowance for eUICC transactions for the MNO, and/or a tenure of the MNO in an assigned trust tier or trust level.

At block 274, the method 260 comprises providing an application programming interface (API) by the evaluation application, where potential subscribers to the MNOs are enabled to compare and evaluate the MNOs. For example, the evaluation application may populate its results to a web site that is accessible by potential subscribers on-line. The evaluation application may populate its results to a web site that is accessible to third party partners such as banks, possibly on a pay-to-play basis. The evaluation application may contextualize the evaluation to make it more useful to end users, for example by presenting not only raw evaluations but providing statistical analysis of each MNO versus the other MNOs. The API may segregate the MNOs into different partitions that may or may not reflect their assignment to different trust tiers or trust levels. For example, MNOs may be assigned to five partitions—a first partition being a highest 20% of MNOs by rating, a second partition being a highest 40% to 21% of MNOs by rating, a third partition being a highest 60% to 41% of MNOs by rating, a fourth partition being a highest 80% to 61% of MNOs by rating, and a fifth partition being the lowest 20% of MNOs by rating. The API may segregate MNOs into different number of partitions, for example into three partitions, four partitions, ten partitions, or some other number of partitions.

Figure 5:
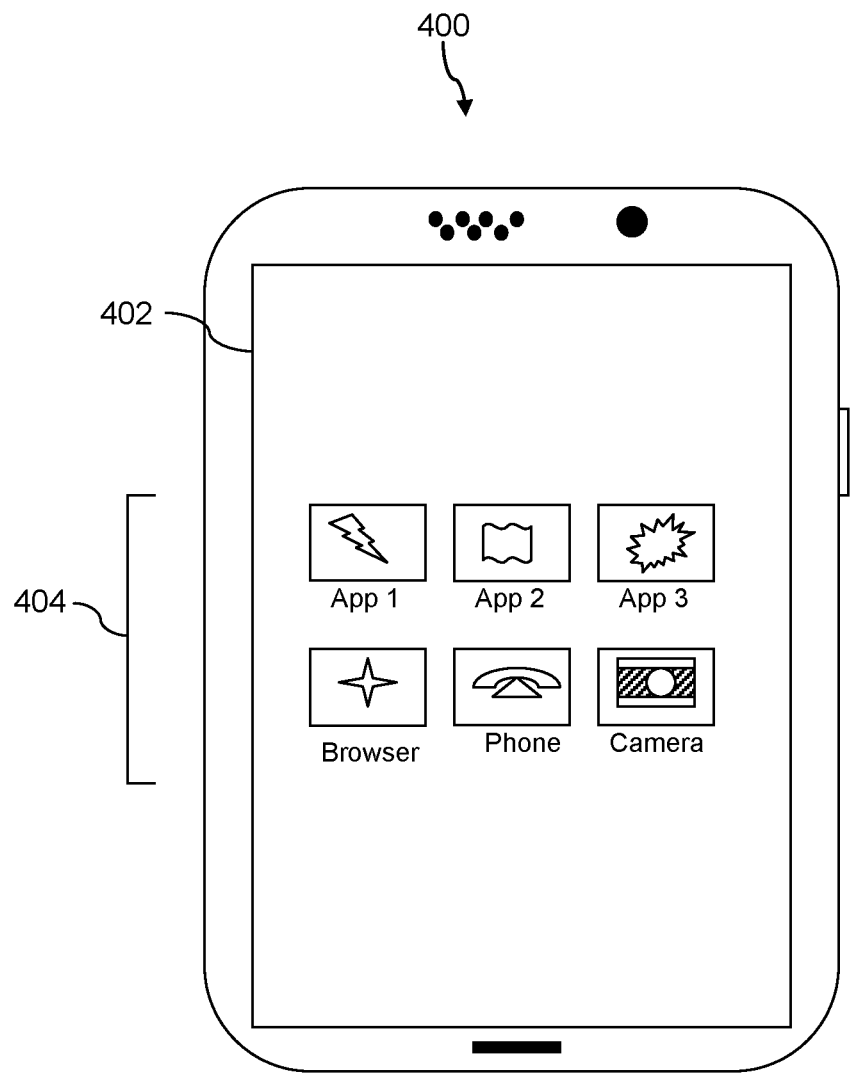
FIG. 5 is an illustration of a wireless communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
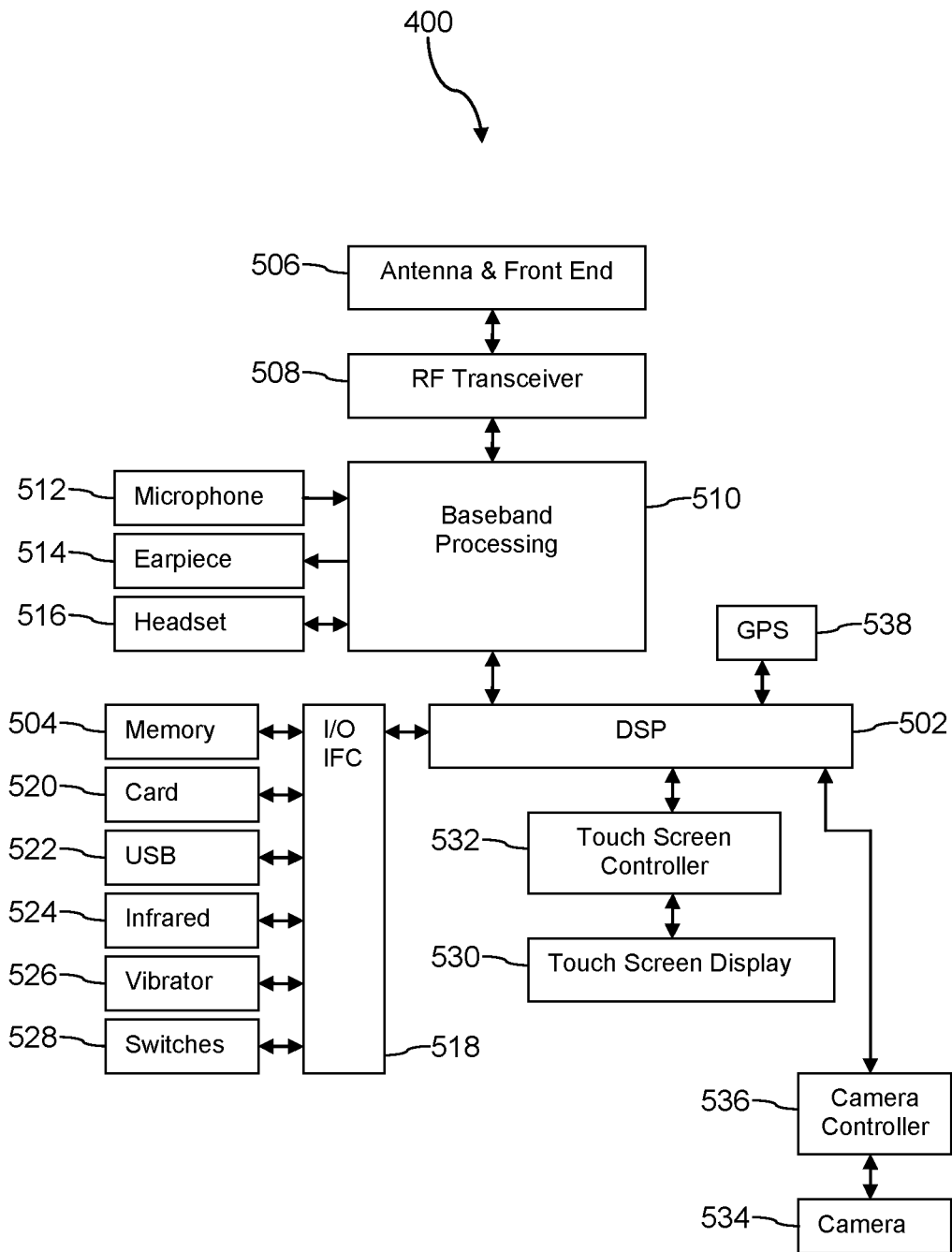
FIG. 6 is a block diagram or a hardware architecture of a wireless communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
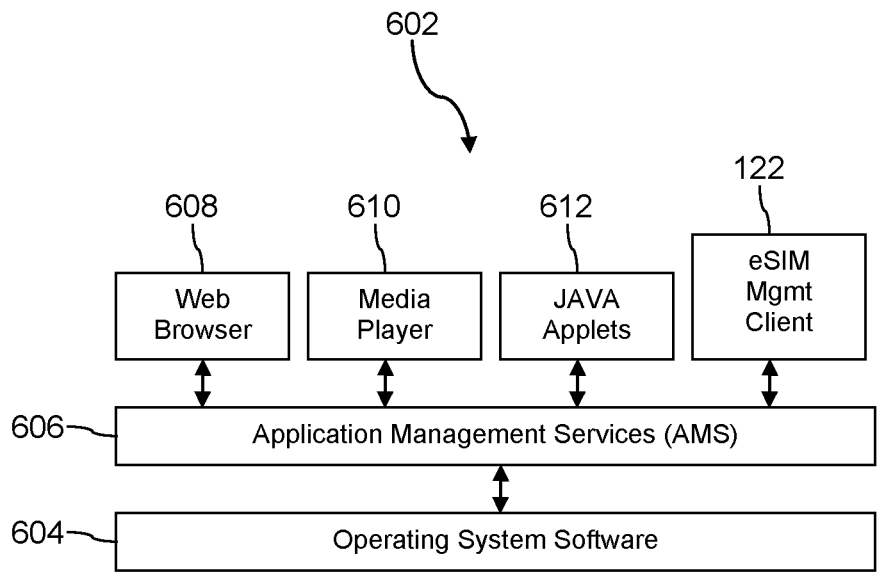
FIG. 7A is a block diagram of a software architecture of a wireless communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and the eSIM management client 122 described above with reference to FIG. 1. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
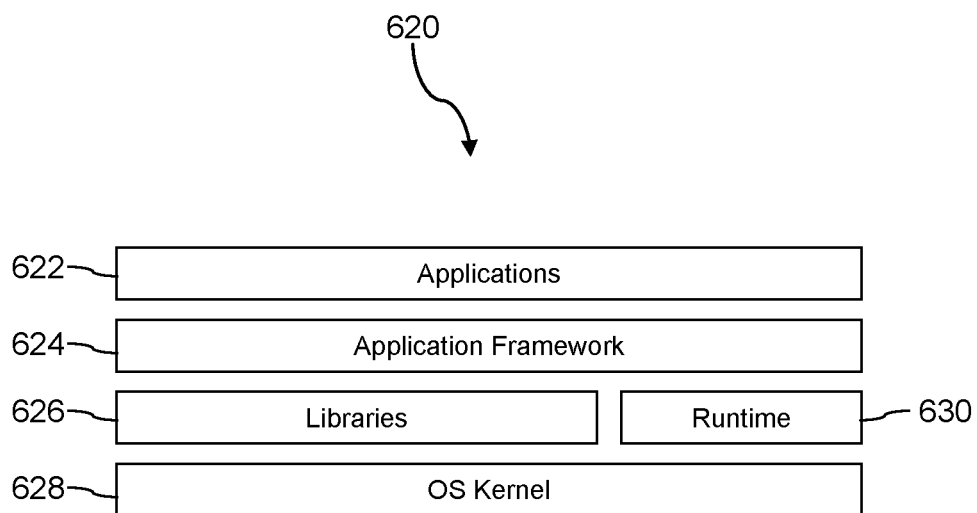
FIG. 7B is a block diagram of another software architecture of a wireless communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
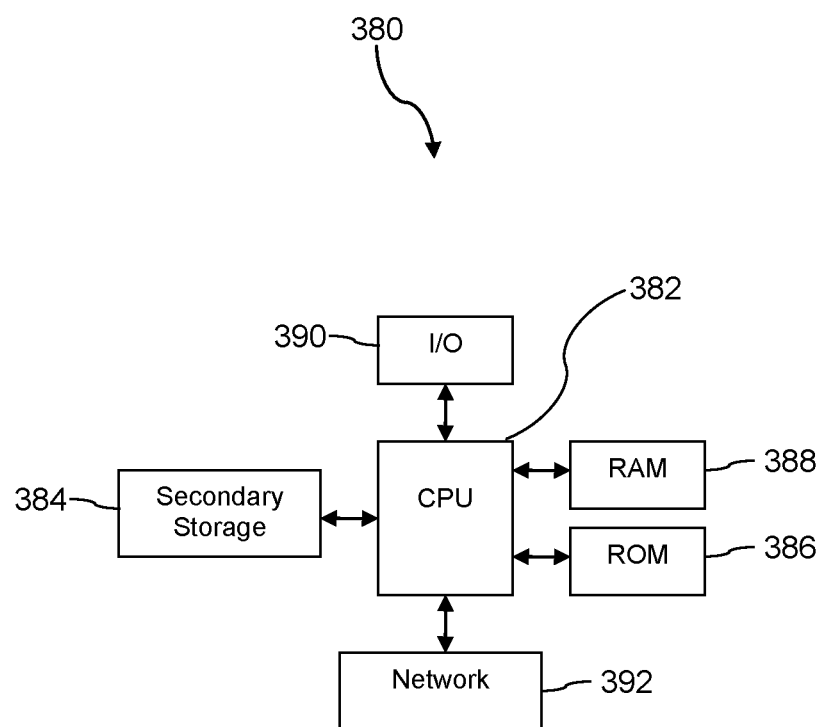
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of updating embedded universal integrated circuit cards (eUICCs) on wireless communication devices, comprising:
reviewing eUICC transactions associated with eUICCs on wireless communication devices by each of a plurality of mobile network operators (MNOs);
based at least in part on reviewing the eUICC transactions by the MNOs, assigning each of the MNOs to one of a first tier, a second tier, and a third tier;
receiving a first eUICC transaction by an eUICC updating application executing on a computer from a first MNO that is assigned to the first tier;
determining by the eUICC updating application that the first MNO is assigned to the first tier;
sending the first eUICC transaction by the eUICC updating application to a wireless communication device without restriction;
receiving a second eUICC transaction by the eUICC updating application from a second MNO that is assigned to the second tier;
determining by the eUICC updating application that the second MNO is assigned to the second tier;
sending the second eUICC transaction by the eUICC updating application to a wireless communication device subject to restrictions associated with the second tier of MNOs;
receiving a third eUICC transaction by the eUICC updating application from a third MNO that is assigned to the third tier;
determining by the eUICC updating application that the third MNO is assigned to the third tier; and
sending the third eUICC transaction by the eUICC updating application to a wireless communication device subject to restrictions associated with the third tier of MNOs, whereby eUICC updating transactions of MNOs are restricted based on MNO tier assignments.

2. The method of claim 1, wherein the eUICC transactions comprise deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile.

3. The method of claim 2, wherein sending the second eUICC transaction subject to restrictions associated with the second tier of MNOs comprises disallowing deleting an eSIM profile from an eUICC.

4. The method of claim 3, wherein sending the second eUICC transaction subject to restrictions associated with the second tier of MNOs comprises disallowing deactivating an eSIM profile.

5. The method of claim 2, wherein the eUICC transactions.

6. The method of claim 5, wherein sending the third eUICC transaction subject to restrictions associated with the third tier of MNOs comprises disallowing any of deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile.

7. The method of claim 1, wherein the wireless communication device is a cell phone, a mobile phone, a smart phone, a personal digital assistant (PDA), a wearable computer, a headset computer, a laptop computer, a notebook computer, a tablet computer, or an Internet of things (IoT) device.

8. A method of managing updates to embedded universal integrated circuit cards (eUICCs) on wireless communication devices, comprising:
receiving eUICC update reports from wireless communication devices by a hyperledger management application executing on a computer system, wherein each eUICC update report describes an eUICC update completed by one of the wireless communication devices;
for each eUICC update report received from the wireless communication devices, creating an eUICC update block by the hyperledger management application comprising a hash of a previous block of a first hyperledger stored in a data store, an identity of a wireless communication device, information about an eUICC update, and a hash over the hash of the previous block of the first hyperledger, over the identity of the wireless communication device, and over the information about the eUICC update;
adding the created eUICC update blocks by the hyperledger management application to the first hyperledger;
receiving eUICC transaction reports from mobile network operators (MNOs) by the hyperledger management application, wherein each eUICC transaction report describes an eUICC transaction completed by one of the MNOs;
for each eUICC transaction report received from the MNOs, creating an eUICC transaction block by the hyperledger management application comprising a hash of a previous block of an associated MNO hyperledger stored in a data store, an identity of an MNO, information about the eUICC transaction, and a hash over the hash of the previous block of the associated MNO hyperledger, over the identity of the MNO, and over the information about the eUICC transaction;
adding the created eUICC transaction block by the hyperledger management application to the associated MNO hyperledger;
reading the blocks of the first hyperledger and of the MNO hyperledgers by an evaluation application executing on a computer system;
analyzing the blocks by the evaluation application;
based on analyzing the blocks, assigning a rating by the evaluation application to each of the MNOs;
assigning each of the MNOs to a tier by the evaluation application based at least in part on the ratings of the MNOs; and
restricting eUICC update activities of at least some of the MNOs based on the tier the MNO is assigned to.

9. The method of claim 8, wherein the eUICC updates comprise deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile.

10. The method of claim 8, wherein the eUICC transactions comprise deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile.

11. The method of claim 10, wherein the eUICC transactions comprise sending a message to a wireless communication device that comprises a link to an eSIM profile stored in a data store and that invites the user of the wireless communication device to click on the link to download and install the eSIM profile stored in the data store.

12. The method of claim 8, wherein the information about the eUICC transaction comprises an indication of granting the eUICC transaction or rejecting the eUICC transaction.

13. The method of claim 8, wherein the rating is determined as a number that is a sum of weighted factors.

14. The method of claim 13, wherein the factors comprise a number of rejected eUICC transactions requested by an MNO, a number of eUICC transaction requests by an MNO, a percentage of eUICC transaction requests versus an allowance for eUICC transactions for the MNO per period of time, and a tenure of an MNO in an assigned tier.

15. A method of reporting comparative results of mobile network operators, comprising:
  receiving eUICC transaction reports from mobile network operators (MNOs) by a hyperledger management application executing on a computer syste, wherein each eUICC transaction report describes an eUICC transaction completed by one of the MNOs;
  for each eUICC transaction report received from the MNOs, creating an eUICC transaction block by the hyperledger management application comprising a hash of a previous block of a hyperledger stored in a data store, an identity of an MNO, information about the eUICC transaction, and a hash over the hash of the previous block of the hyperledger, over the identity of the MNO, and over the information about the eUICC transaction;
  adding the created eUICC transaction block by the hyperledger management application to the hyperledger;
  reading the blocks of the hyperledger by an evaluation application executing on a computer system;
  analyzing the blocks by the evaluation application;
  based on analyzing the blocks, assigning a rating by the evaluation application to each of the MNOs; and
  providing an application programming interface (API) by the evaluation application, where potential subscribers to the MNOs are enabled to compare and evaluate the MNOs.

16. The method of claim 15, wherein the eUICC transactions comprise deleting an eSIM profile from an eUICC, adding an eSIM profile to an eUICC, deactivating an eSIM profile of an eUICC, activating an eSIM profile of an eUICC, enabling an eSIM profile, of an eUICC, disabling an eSIM profile of an eUICC, and editing a name of an eSIM profile.

17. The method of claim 15, wherein the information about the eUICC transaction comprises an indication of granting the eUICC transaction or rejecting the eUICC transaction.

18. The method of claim 15, wherein providing the API by the evaluation application comprises populating results of the evaluation application to a web site.

19. The method of claim 15, wherein providing the API by the evaluation application comprises providing statistical analysis of each MNO versus the other MNOs.

20. The method of claim 19, wherein providing the API comprises segregating the MNOs into different partitions based on the statistical analysis.

* * * * *